(12) United States Patent
Huang

(10) Patent No.: US 7,010,969 B1
(45) Date of Patent: Mar. 14, 2006

(54) ELECTRONIC MEASURING DEVICE FOR MEASURING THE PRESSURE AND TREAD DEPTH OF A TIRE

(76) Inventor: Wei-Meng Huang, No. 35, Sec. 4, Ding Tsao Rd., Lugang Township, Changhua County (TW) 505

( * ) Notice: Subject to any disclaimer, the term of this patent is extended or adjusted under 35 U.S.C. 154(b) by 0 days.

(21) Appl. No.: 11/114,145

(22) Filed: Apr. 26, 2005

(51) Int. Cl.
*G01M 17/02* (2006.01)
(52) U.S. Cl. ..................................... 73/146
(58) Field of Classification Search .............. 73/146, 73/146.2–146.8, 7, 8, 9; 152/152.1, 415; 340/442–447
See application file for complete search history.

(56) References Cited

U.S. PATENT DOCUMENTS 6,634,223 B1 * 10/2003 Hartmann et al. ............. 73/146
6,826,951 B1 * 12/2004 Schuessler et al. ........... 73/146

* cited by examiner

*Primary Examiner*—William Oen
(74) *Attorney, Agent, or Firm*—Bacon & Thomas, PLLC

(57) ABSTRACT

For measuring the pressure and tread depth of a tire, an electronic measuring device is disclosed to include a housing, a tread scale, which has a sliding block coupled to the housing and movable along an elongated sliding slot and a measuring tip fixedly connected to the sliding block and movable in and out of the housing, a variable resistor mounted inside the housing for outputting a variation of resistance value indicative of movement of the measuring tip relative to the housing, a pressure sensor mounted in the housing for detecting the pressure of a tire, a display, and a circuit board mounted inside the housing and electrically connected with the variable resistor, the pressure sensor and the display for converting the variation of resistance value received from the variable resistor into a readable distance value and the signal outputted from the pressure sensor into a readable pressure reading for display on the displays.

3 Claims, 4 Drawing Sheets

ELECTRONIC MEASURING DEVICE FOR MEASURING THE PRESSURE AND TREAD DEPTH OF A TIRE

BACKGROUND OF THE INVENTION

1. Field of the Invention

The present invention relates to a tire detection instrument and more specifically, to an electronic measuring device for measuring the pressure and tread depot of a vehicle tire.

2. Description of the Related Art

For a safety driving of a car, it is important to maintain the tires of the car properly. Proper inflation pressure and sufficient tread depth are important factors in tire care. Except complicated inspection items, a car owner can measure the inflation pressure and tread depth of the tires by oneself.

Various measure devices are commercially available for measuring the inflation pressure and tread depth of vehicle tires. FIGS. 1 and 2 show a tire pressure and tread depth measuring instrument according to the prior art. According to this design, the instrument 1 comprises a meter 2, a connector 3, and a scale 4. The meter 2 has a pointer 2a coupled to a gear wheel 2b. The scale 4 has a rack 4a longitudinally disposed at one lateral side and meshed with the gear wheel 2b. When in use, the connector 3 is attached to the air valve of the tire (not shown) so that the inflation pressure of the tire is readable through the indication of the pointer 2a. At this time, the scale 4 is extended to the outside of the instrument 1 so that the user can attach the free end 4b of the scale 4 to the bottom edge of the tread pattern of the tire and the reference edge 2c of the meter 2 stopped against the outer surface of the tire and then read the reading 4c of the scale 4. The reading 4c indicated at this time is the value of the tread depth of the tire. This measuring instrument 1 has a simple structure. However, it is not convenient to use. When in use, the user must measure the inflation pressure of tire at first to have the scale 4 be extended out of the instrument, and then start measuring the tread depth of the tire. Further, because this instrument is a design of mechanical transmission, the value measured is not very accurate.

SUMMARY OF THE INVENTION

The present invention has been accomplished under the circumstances in view. It is the main object of the present invention to provide an electronic measuring device, which is practical for measuring the pressure as well as the tread depth of a vehicle tire. It is another object of the present invention to provide an electronic measuring device, which is convenient to use and provides an accurate measuring result.

To achieve these and other objects of the present invention, the electronic measuring device comprises a housing, the housing comprising a chamber, an elongated sliding slot, a through hole, and an air hole connectable to the air valve of a vehicle tire for receiving air pressure from the vehicle tire, the elongated sliding slot and the through hole and the air hole being in communication with the chamber; display means mounted in the housing; a tread scale for measuring the tread depth of a vehicle tire, the tread scale comprising a sliding block coupled to the housing and movable along the elongated sliding slot, and a measuring tip fixedly connected to the sliding block and movable in and out of the through hole; a variable resistor mounted in the chamber inside the housing and adapted to output a variation of resistance value indicative of movement of the measuring tip relative to the housing; a pressure sensor mounted in the chamber inside the housing and adapted to detect the pressure of air entering the air hole and to output a signal indicative of the pressure of air detected; and a circuit board mounted in the chamber inside the housing and electrically connected with the variable resistor, the pressure sensor and the display means and adapted to convert the variation of resistance value received from the variable resistor into a readable distance value and the signal outputted from the pressure sensor into a readable pressure reading for display on the display means.

DETAILED DESCRIPTION OF THE INVENTION

Figure 1:
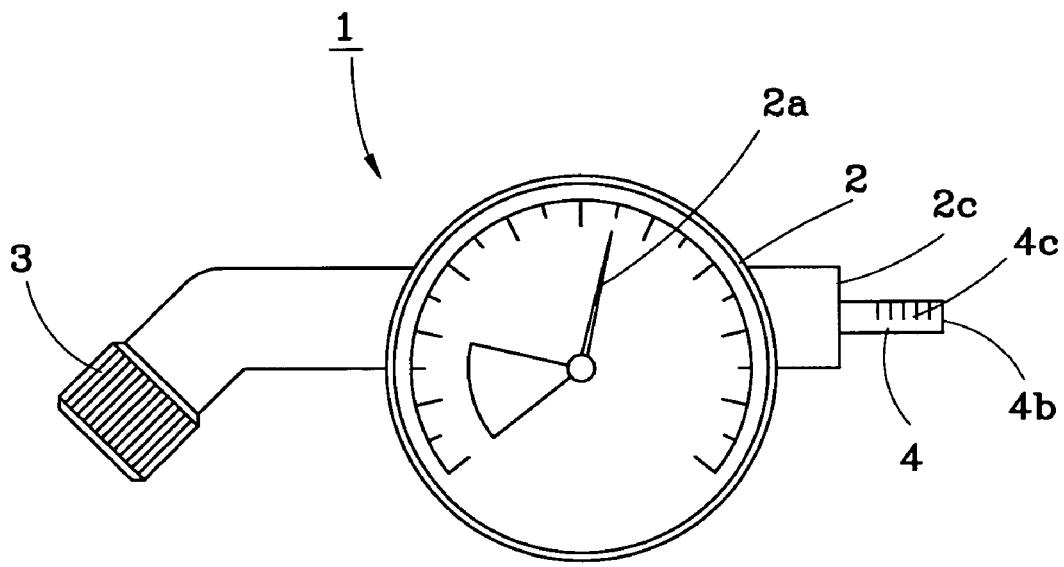
FIG. 1 is a plain view of a conventional tire pressure and tread depth measuring instrument according to the prior art.
Figure 2:
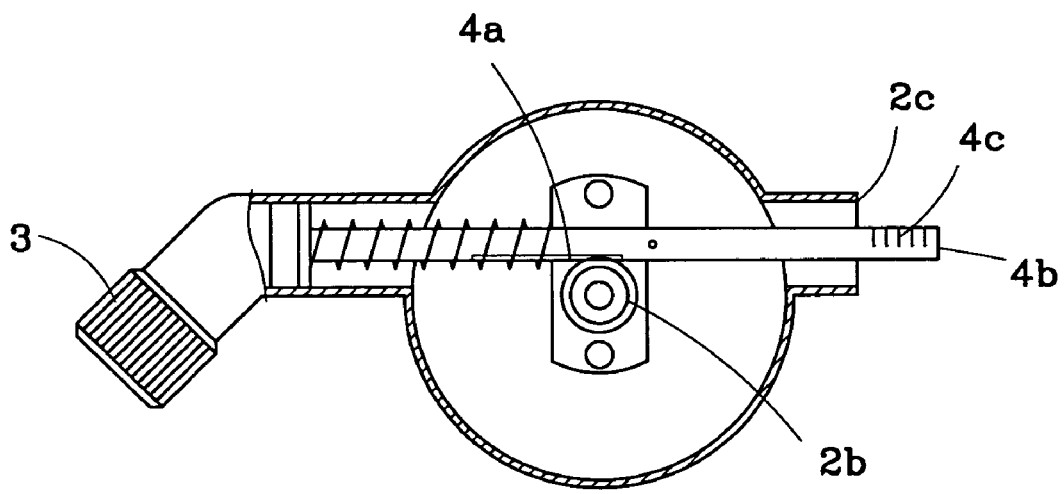
FIG. 2 is a sectional view of the prior art measuring instrument.
Figure 3:
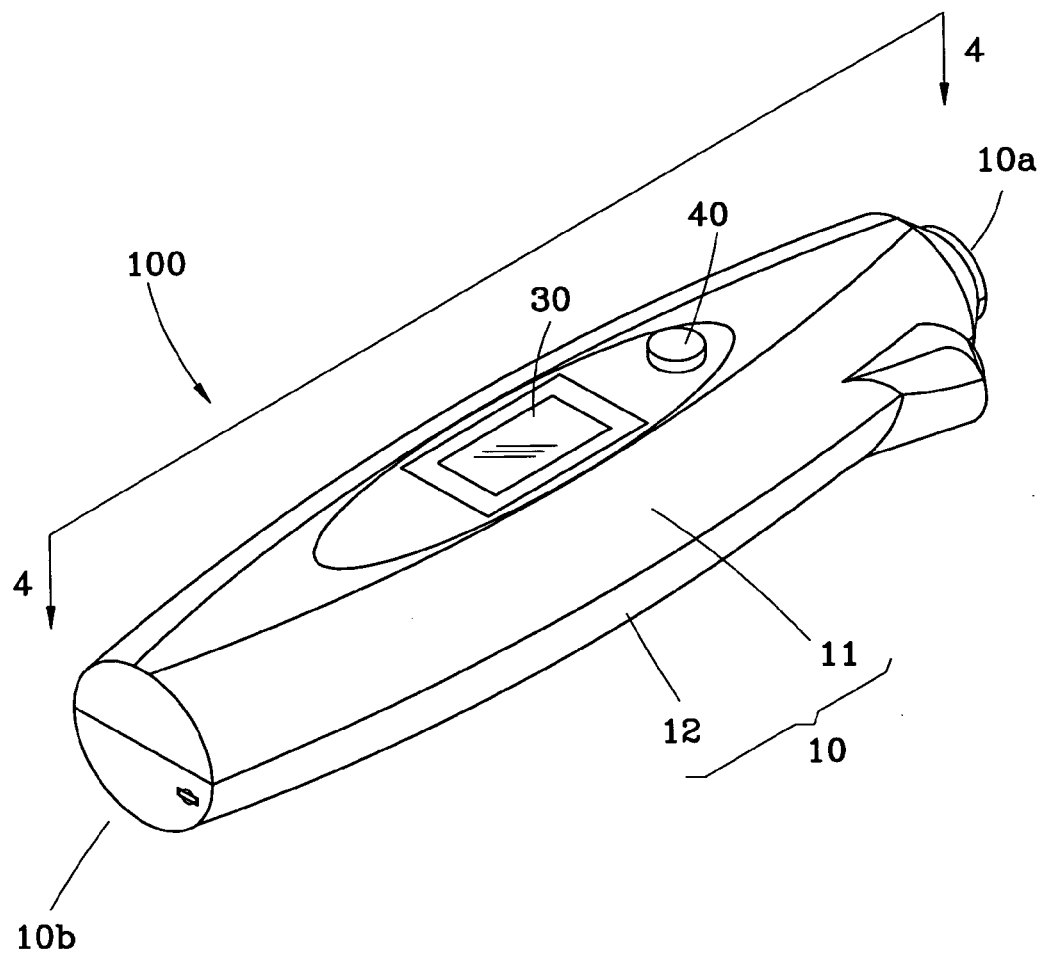
FIG. 3 is an elevational view of an electronic measuring device according to the present invention.

Referring to FIGS. 3~6, an electronic measuring device 100 in accordance with the present invention is shown comprising a housing 10, a battery pack 20, a display 30, a button 40, a tread scale 50, a circuit board 60, a variable resistor 70, and a pressure sensor 80.

The housing 10 is formed of a top cover shell 11 and a bottom cover shell 12, having a front side 10a and a rear side 10b. The housing 10 defines a chamber 13 and an air hole 14 in air communication with the chamber 13. The air hole 14 is at the front side 10a of the housing 10. The battery pack 20 is provided inside the chamber 13 to provide the necessary working voltage for the electronic measuring device 100.

The top cover shell 11 has an opening 111 and a circuit hole 112. The opening 111 accommodates the display 30. The display 30 is electrically connected to the circuit board 60. The circular hole 112 accommodates the button 40. The button 40 is electrically connected to the circuit board 60 and the battery pack 20 for power on/off control. The bottom cover shell 12 has a longitudinal sliding slot 121 and a through hole 122. The through hole 122 is at the rear side 10b of the housing 10. The rear side 10b of the housing 10 is a flat wall that can be closely attached to the tread of the tire to be measured to work as a reference plane.

Figure 4:
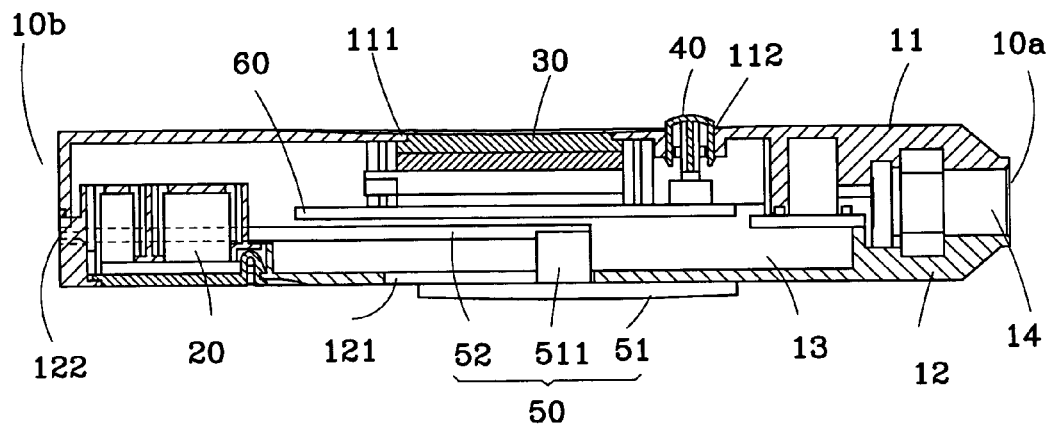
FIG. 4 is a sectional view taken along line 4—4 of FIG. 3, showing the measuring tip received inside the housing.
Figure 6:
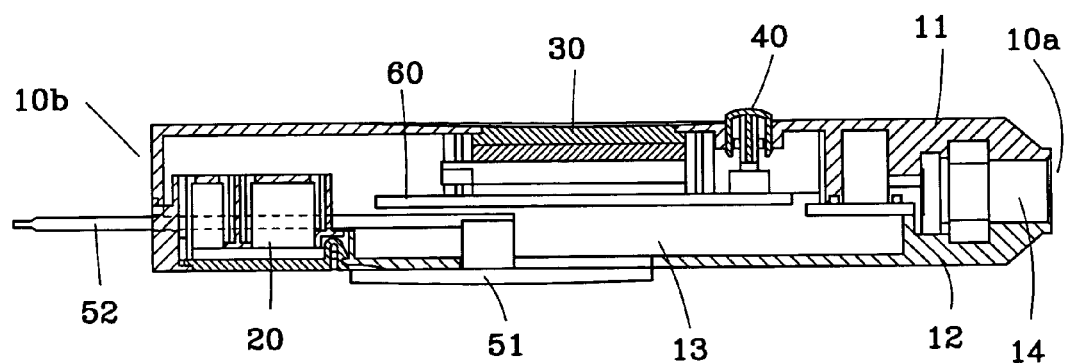
FIG. 6 is similar to FIG. 4 but showing the measuring tip extended out of the housing.
Figure 5:
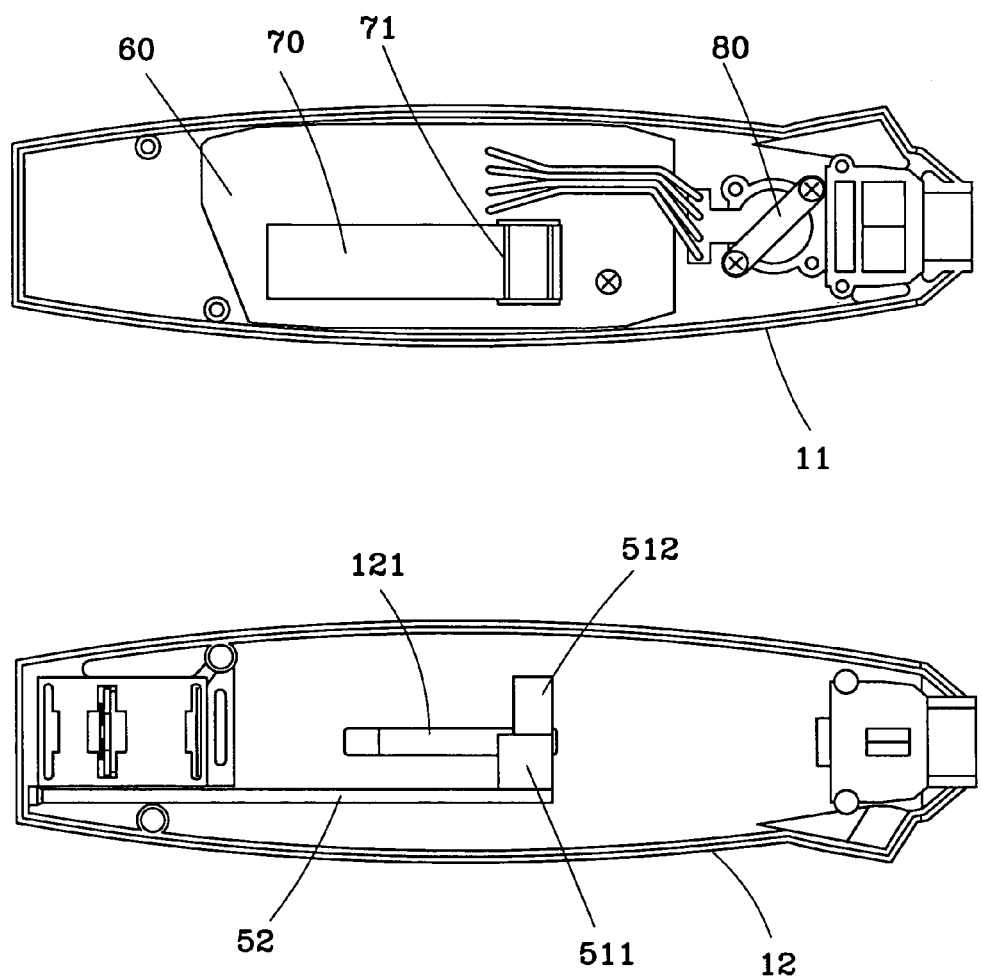
FIG. 5 is a schematic drawing showing the internal arrangement of the electronic measuring device according to the present invention.

The tread scale 50 comprises a sliding block 51 and a measuring tip 52. The sliding block 51 is provided outside the bottom cover shell 12, having a coupling portion 511 and a driving portion 512. The coupling portion 511 is coupled to the longitudinal sliding slot 121 of the bottom cover shell 12 to guide smooth movement of the read scale 50 longitudinally forwards/backwards along the longitudinal sliding slot 121. The driving portion 512 is extending from the coupling portion 511 and suspending inside the housing 10. The measuring tip 52 has one end fixedly connected to the coupling portion 511 and the other end aimed at the through hole 122 of the bottom cover shell 12. When moved the sliding block 51 to one end of the longitudinal sliding slot 121 of the bottom cover shell 12, the measuring tip 52 is received inside the chamber 13 of the housing 10 as shown in FIG. 4. On the contrary, when moving the sliding moved the sliding block 51 to the other end of the longitudinal sliding slot 121 of the bottom cover shell 12, the measuring tip 52 is extended out of the chamber 13 of the housing 10 through the through hole 122 as shown in FIG. 6.

The circuit board 60 is steadily mounted in the chamber 13 inside the housing 10, having set therein distance converting circuit, pressure circuit, a micro controller, and the related circuit means.

The variable resistor 70 is electrically connected to the circuit board 60, having a lever 71 coupled to the driving portion 512 of the sliding block 51 of the tread scale 50. When moving the sliding block 51 along the longitudinal sliding slot 121 of the bottom cover shell 12, the lever 71 of the variable resistor 70 is relatively moved, thereby causing the variable resistor 70 to change the output of the resistance value. The variation of the resistance value is then converted into a corresponding frequency by the distance converting circuit of the circuit board 60, and then converted into a readable distance reading by the micro controller of the circuit board 60 for display on the screen of the display 30. Through the reading displayed on the screen of the display 30, the user knows the tread depth of the tire so that the user can decide if it is the time to replace the tire.

The pressure sensor 80 is mounted in the chamber 13 inside the housing 10 behind the air hole 14. When switched on the electronic measuring device 80, the air hole 14 is attached to the air valve of the tire, enabling the pressure sensor 80 to detect the internal air pressure of the tire and to output a corresponding signal to the circuit board 60. Upon receipt of the signal from the pressure sensor 80, the pressure circuit of the circuit board 60 converts the signal into a frequency, which is then converted into a readable tire pressure value by the micro controller of the circuit board 60 and then displayed on the screen of the display 30. Subject to the reading of tire pressure value displayed on the screen of the display 30, the user can decide if it is necessary to inflate the tire right away.

When using the electronic measuring device 100, the micro controller of the circuit board 60 can adjust the control of the measuring time of the distance converting circuit and the pressure circuit. Therefore, the electronic measuring device 100 fits different measuring requirements.

As indicated above, the invention provides an electronic measuring device 100, which is practical for measuring the air pressure as well as the tread depth of a tire. Because the measuring device 100 is an electronic device, it is convenient to use, providing an accurate measuring result. Further, the electronic measuring device 100 achieves tread depth measuring by means of a sliding measuring tip and a variable resistor. This design provides an accurate measuring result and, reduces the manufacturing cost.

A prototype of electronic measuring device has been constructed with the features of FIGS. 3~6. The electronic measuring device functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electronic measuring device comprising:
   a housing, said housing comprising a chamber, an elongated sliding slot, a through hole, and an air hole connectable to the air valve of a vehicle tire for receiving air pressure from the vehicle tire, said elongated sliding slot and said through hole and said air hole being in communication with said chamber;
   display means mounted in said housing;
   a tread scale for measuring the tread depth of a vehicle tire, said tread scale comprising a sliding block coupled to said housing and movable along said elongated sliding slot, and a measuring tip fixedly connected to said sliding block and movable in and out of said through hole of said housing;
   a variable resistor mounted in said chamber inside said housing and adapted to output a variation of resistance value indicative of movement of said measuring tip relative to said housing;
   a pressure sensor mounted in said chamber inside said housing and adapted to detect the pressure of air entering said air hole and to output a signal indicative of the pressure of air detected; and
   a circuit board mounted in said chamber inside said housing and electrically connected with said variable resistor, said pressure sensor and said display means and adapted to convert the variation of resistance value received from said variable resistor into a readable distance value and the signal outputted from said pressure sensor into a readable pressure reading for display on said display means.

2. The electronic measuring device as claimed in claim 1, wherein said circuit board comprises a distance converting circuit adapted to convert the variation of resistance value received from said variable resistor into a frequency, a pressure circuit adapted to convert the signal outputted from said pressure sensor into a frequency, and a micro controller adapted to convert the frequency corresponding to the variable of resistance value received from said variable resistor into a readable distance value for display on said display means and the frequency corresponding to the signal outputted from said pressure sensor into a readable pressure value for display on said display means.

3. The electronic measuring device as claimed in claim 1, wherein said sliding block of said tread scale comprises a coupling portion coupled to and movable along said elongated sliding slot of said housing, and a driving portion extending from said coupling portion and suspending in the chamber inside said housing; said variable resistor has a lever connected to said driving portion of said sliding block for causing said variable resistor to output a variable of resistance value subject to the amount of movement of said sliding block along said elongated sliding slot.

* * * * *